June 21, 1966 H. W. COLE, JR 3,257,084

ENDLESS TAPE CARTRIDGE

Filed Sept. 7, 1962

INVENTOR
Howard W. Cole Jr
BY Emery, Whittemore, Scrivener & Graham
ATTORNEYS.

United States Patent Office

3,257,084
Patented June 21, 1966

3,257,084
ENDLESS TAPE CARTRIDGE

Howard W. Cole, Jr., 12 Vale Drive, Mountain Lakes, N.J.

Filed Sept. 7, 1962, Ser. No. 222,018
13 Claims. (Cl. 242—55.19)

This invention relates to tape holders for endless tape which is stored in a spiral, and tape is withdrawn from the inside convolution of the spiral, passed to apparatus in which the tape is used, and then returned to the outside of the spiral. Tape holders of this kind may be used for motion picture film; or for magnetic film on which sound is recorded, or other signals for computer use; or for any situation where it is desirable to use an endless tape.

It is an object of the invention to provide an improved holder for an endless tape. More particularly it is an object of the invention to provide a tape holder that can be operated with smooth feeding of the tape at higher speed than tape holders of the prior art and that will operate successfully with rapid deceleration of the feed.

Another object of the invention is to provide a tape holder with a brake for stopping or retarding further feeding of tape when the apparatus using the tape stops or declerates rapidly, and to have the operation of the brake automatic so that the brake is not applied when the tape is being withdrawn from the holder during normal operation of the apparatus.

The preferred embodiment of the invention is a tape holder with a drum that has friction contact with the tape for withdrawing tape from the inside convolution of a spiral of tape stored between one end of the drum and a retaining flange, and the inside of the spiral of stored tape contacts with a ring having a larger diameter than the drum so that the ring rotates at a slower speed than the drum. The construction is suitable for operation with an orientation that locates the axis of rotation of the drum, flange and ring along a horizontal line.

Other objects, features and advantages of the invention will appear or be pointed out as the description proceeds.

In the drawing, forming a part hereof, in which like reference characters indicate corresponding parts in all the views.

Figure 1:
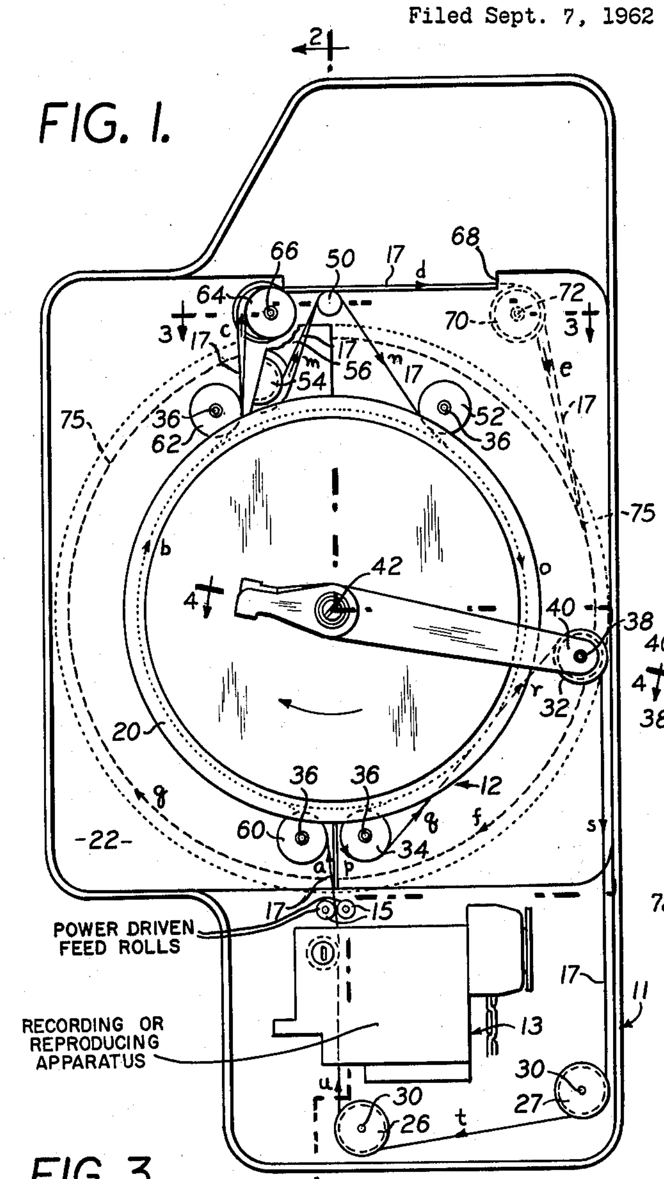
FIGURE 1 is a side elevation of a tape holder made in accordance with this invention.
Figure 2:
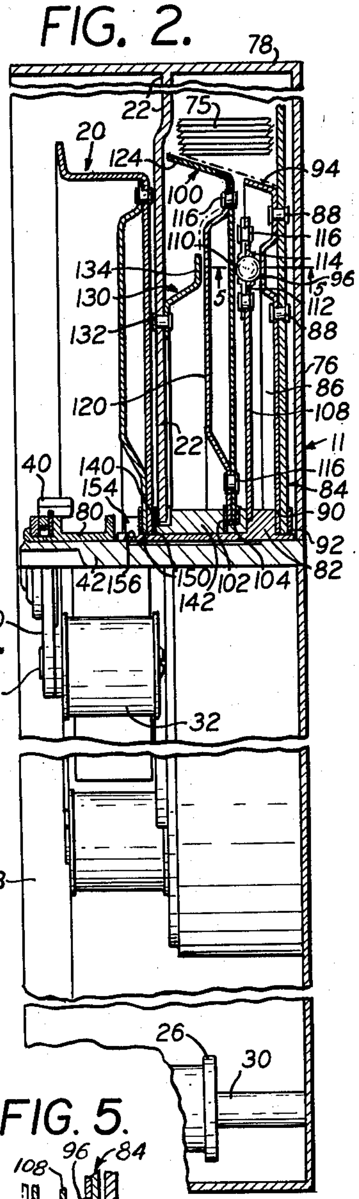
FIGURE 2 is an enlarged sectional view, partly broken away, taken on the line 2—2 of FIGURE 1.
Figure 5:
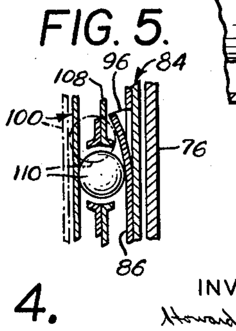
Figure 3:
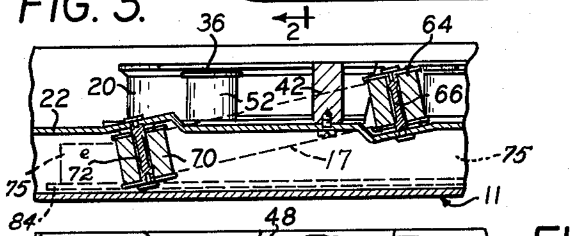
Figure 4:
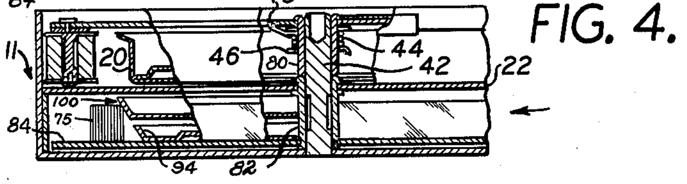

FIGURES 3 and 4 are enlarged, fragmentary, sectional views taken on the lines 3—3 and 4—4, respectively of FIGURE 1; and FIGURE 5 is an enlarged, fragmentary sectional view taken on the line 5—5 of FIGURE 2.

FIGURE 1 shows a housing 11 for a tape holder 12 and apparatus 13 for using the tape. This apparatus 13 is shown diagrammatically and may be a portion of a moving picture machine or sound recording and reproducing apparatus. That illustrated has feed rolls 15 which are operated by power to move a film 17 in the direction indicated by the arrow heads. The apparatus 13 and the feed rolls 15 are inserted into the housing 11 through an opening in a cover of the housing. This cover and the opening are not shown in the drawing since introduction of recording or reproducing heads and driving means through an opening in the housing is a conventional expedient for tape cartridges as shown in Cousino Patent No. 2,922,642, dated January 26, 1960. The housing 11 includes a drum 20 and this drum is located above a partition 22 which divides the housing into different chambers. In the chamber behind the partition 22 there is space for holding a spiral of tape between the back of the drum 20 and a flange which will be described in connection with other figures. For the present it is sufficient to understand that the tape is stored behind the partition 22. The tape 17 is pulled by the feed rollers 15 over guides comprising idler rollers 26 and 27 located on stud axles 30 which extend from the back wall of the housing 11.

Above the roller 27 there is a run of the tape 17 which advances from a tensioning roller 32. The tape 17 comes to the tensioning roller 32 from another guide roller 34 which rotates on a stud axle 36 extending upwardly from the partition 22. The tape 17, therefore, substantially reverses its direction of travel as it passes from the guide roller 34 around the tensioning roller 32 and then to the other guide roller 27.

The tensioning roller 32 has an axle 38 carried by an arm 40 which is angularly movable about a center axle 42 about which the drum 20 rotates. There is a spring 44, best shown in FIGURE 4, wrapped around the center axle 42 and tensioned between an anchor 46 on the axle 42 and a connection 48 of the spring 44 to the arm 40. This spring 44 is wrapped and tensioned in a direction to urge the arm 40 to move counterclockwise in FIGURE 1 and thus the pressure of the spring maintains a tension on the tape 17.

The tape 17 comes to the guide roller 34 about a substantial arc of the drum 20. The tape 17 approaches the drum 20 from a guide roller 50 and passes across another guide roller 52 which holds the tape close to the drum 20. Neither of the guide rolls 34 or 52 clamp the tape against the drum 20 but they hold the tape so that it must contact with the drum 20 in passing from the guide roll 52 to the guide roll 34. This results from the fact that the drum 20 extends for a substantial distance beyond a straight line connecting the guide rolls 34 and 52.

The tape 17 comes to the guide roller 50 from the storage space behind the partition 22. FIGURE 1 shows a roller 54 located behind the partition 22 and partly visible through an opening 56 in the partition 22. The tape 17 is shown coming forward from the guide roll 54 through the opening 56 in the partition 22 and to the guide roll 50 which is ahead of the partition 22.

After the tape has passed through the apparatus 13 and beyond the feed rolls 15, it passes around another guide roll 60 on a stud arle 36 and then passes around an arc of the drum 20, on the other side of the drum from the run of tape which travels between the guide rolls 52 and 34. At the upper end of a left hand arc of the drum 20 there is another guide roller 62, on a stud axle 36 around which the tape 17 passes and from which the tape travels to an oblique guide roller 64 supported on a sloping axle 66 extending forward from the partition 22. This oblique guide roller 64 changes the direction of travel of the tape 17 so that the tape travels downwardly through a cut 68 in the partition 22 and to a giude roller 70 located behind the partition 22. The guide roller 70 is supported on a stud axle 72 which extends rearwardly from the partition 22. This guide roller 70 is also an oblique guide roller being carried by the stud axle 72 which is set at an angle to the partition 22 is clearly shown in FIGURE 3.

After passing around the guide roller 70, the tape 17 travels to the outside of a spiral of tape 75 located behind the partition 22. When the tape holder is in operation, this spiral of tape 75 rotates about the axis of the center axle 42 and thus wraps the tape from the guide roller 70 around the spiral as an outside convolution while tape is fed from the inside convolution to the guide roller 54 and forward to the guide roller 50 as previously explained.

Reviewing the course of the tape from the feed roll 15, the tape 17 passes along a run *a*, around a guide roll 60 and then along a run *b* in contact with a substantial angular extent of the circumference of the drum 20. The tape passes another guide roll 62 and then travels away from the drum 20 along a run *c* to an obliquely mounted guide roll 64 from which the tape 17 travels downwardly along a run *d* through a cut-out 68 to the lower level under the partition 22.

At the lower level, the tape 17 passes around another guide roll 70, best shown in FIGURE 3; and beyond the guide roll 70, the tape passes along a run *e* and wraps on the outside of the spiral of tape 75. The tape wraps on the spiral of tape, as the spiral turns counter-clockwise as indicated by successive tape positions *f* and *g* in FIGURE 1.

The inner convlution of the tape is led away and upward around the guide roll 54, along a run in and around a guide roll 50 from which the tape passes along a run *n* to another guide roll 52 to hold a run *o* beyond this guide roll 52 is contact with a substantial arc of the circumference of the drum 20.

The tape 17 leaves the drum 20 at a run *p* that passes around a guide roll 34 and then along runs *q* and *r* to a tensioning roll 32. Beyond the tensioning roll 32, the tape travels along a run *s* to the guide roll 27, then along a run *t* to another guide roll 26 from which a run *u* of the tape brings the tape back to the feed roll 15 from which this review began.

FIGURE 2 shows the structure in the housing 11 behind the partition 22. The center axle 42 is rigidly connected with a back wall 76 of the housing 11. The housing has side walls 78, and the partition 22 is rigidly connected with these side walls.

The center axle 42 is, therefore, stationary. There is a bushing 80 secured to the center axle 42, and the arm 40 rotates on this bushing 80.

There is a supporting bushing 82 which fits around the center axle 42 and a flange 84 is secured to the supporting bushing 82 at the right hand end of the bushing in FIGURE 2. The flange 84 has an annular dished portion 86 secured to the rest of the flange by rivets 88. This dished portions 86 and the rest of the flange 84 are securely clamped against a shoulder 90 on the bushing 82 by a riveted end portion 92 of the bushing. Thus the flange 84 and the supporting bushing 82 are a unitary structure. When the invention is oriented with the axis of the bushing 82 extending vertically and with the drum 20 uppermost, the spiral of tape 75 rests on the flange 84.

The dished portion 86 of the flange 84 has a hub comprising a frustro conical peripheral surface 94 extending for same distance beyond the face of the left hand portion of the flange 84. The dished portion 86 also has a plurality of protuberances 96 which are displaced from the dished portion 86 toward the left in FIGURES 2 and 5, and which are constructed with surfaces that form inclined planes with respect to the rest of the flange 84, and the purpose of which will be explained later.

There is a floating ring 100 which fits into a packing ring 102 surrounding a hub 104 of the ring 100. This hub 104 permits the ring 100 to rotate about the axis of the center axle 42 independently of the supporting bushing 82. When the invention is oriented with the axis of the bushing 82 extending horizontaly, as shown in FIGURE 2, the spiral of tape 75 rests on the ring 100 and the flange 84 serves as a stop in contact with one side of the spiral to keep it from sliding down the slope of the ring 100.

There is a ball carrier 108 with a center portion that fits into a bearing formed by a shoulder of the bushing 82 and an end face of the hub 104. This ball carrier 108 rotates in this bearing independently of the supporting bushing 82 and independently of the floating ring 100. There are balls 110 supported by the carrier 108 at angularly spaced points around the ball carrier. These balls 110 are located in a cage 112 formed by displaced portions of the ball carrier including an annular ring 114 which is connected to the rest of the ball carrier by rivets 116. Each of the balls 110 is located opposite one of the protuberances 96 and in the operation of the automatic brake, which will be explained later, the balls 110 climb up the inclined faces of the protuberances 96.

The drum 100 is made of material having some flexibility and it is provided with a stiffening plate 120 which is connected to the rest of the drum 100 by rivets 116. The drum 100 has a frusto conical peripheral face 124 which is in substantial alignment with the frusto conical peripheral face 94 of the flange 84. The spiral of tape 75 is supported by the drum 100 when the axle 42 extends horizontally. The left hand side of the inner convolution of the spiral of tape 75 rests on the frusto conical circumferential surface 124 of the drum 100 and the outer portion of the flange 84 prevents the spiral of tape 75 from sliding down the incline. It is a feature of the construction that the diameter of the drum 100 which contacts with the spiral of tape 75 is larger than the diameter of the cylindrical portion of the drum 20.

There is a stationary backup ring 130 secured to the partition 22 by rivets 132. This backup ring 130 is annular and is preferably concentric with the axis of the center axle 42. It has a peripheral portion 134 with a flat face that confronts a face of the stiffening plate 120 of the floating ring 100. When the balls 110 climb up the incline of the protuberances 96, the balls are deflected toward the left in FIGURE 2 and into contact with the drum 100. When this pressure from the balls is substantial, the drum 100 is deflected into contact with the peripheral portion 134 of the backup plate. Since the backup plate 130 is attached to the fixed partition 22, the backup plate serves as an effective brake for stopping rotation of the floating ring 100. FIGURE 2 shows this deflection of the ring 100 in dotted lines.

The partition 22 extends into packing 140 in a hub 142 that fits the supporting bushing 82 and that permits the supporting bushing 82 to rotate independently of the partition 22 and the hub 142.

The drum 20 fits around the supporting bushing 82 as a bearing and is held against axle displacement by thrust bearing washers 150 located between one end of the hub 142 and a snap ring 154 which fits into a groove 156 in the supporting bushing 82.

When the apparatus using the tape stops, or while it is decelerating rapidly, the energy of the rotating spiral of tape 75 will cause the spiral of tape to continue in motion until the energy is absorbed. If the tape in the storage section, that is, the spiral of tape 75, does not stop at the same rate as the drum 20 and the flange 84, the convolution of the tape will be moving faster than the drum and since the innermost convolution is in contact with the floating ring 100, the tape will continue to be pushed out of the center of the spiral of tape 75 until the inertial energy of the spiral of tape is absorbed. This will result in a slacked tape on one side of the drum. The tape will wrap tight on the floating ring so that at the next start up, tape withdrawal will be difficult if not impossible.

By having the diameter of the floating ring 100, which contacts with the inner convolution of the spiral of tape 75, larger than the diameter of the drum 20, the floating ring 100 rotates slower than the drum 20, since the ring rotation depends upon lineal speed of the tape. With the tape 75 in contact with the flange 84, as shown in solid lines in FIGURE 2, the flange 84 also turns slower than the drum 20.

If tension is applied to the tape coming out of the center of the spiral of tape 75 and from around the floating ring 100, the tape will contact the peripheral surface 94 of the flange 84. This will cause the floating ring 100 and the flange 84 to turn together, but since the peripheral surface 94 of the flange 84 is considerably smaller in diameter than the floating ring 100, and the floating ring is rotated by the lineal speed of the tape, the floating ring will rotate at a slower angular speed than the flange 84. Whenever any rotation results from contact with the tape, it is the lineal speed of the tape that determines the speed of rotation.

If the spiral of tape 75 is in high speed rotation and the flange 84, and drum 20 are suddenly stopped, or made to decelerate rapidly, the inertia of the ball carrier 108 causes the balls 110 to roll up the inclined surfaces of the protuberances 96 and under these conditions the ring 100 will be rotating faster than the flange 84. The inertia of the floating ring 100 and the inertia of the entire mass of the spiral tape 75 which is supported by the ring causes the balls 110 to roll up the incline surfaces of the protuberances 96 more tightly. Under low deceleraton forces, the friction of the balls alone is enough to stop the ring 100 and the innermost convolution of the tape from further rotation. Under high deceleration loads, the balls 110 deflect the ring 100 far enough so that it will contact the backup ring 130, as indicated in dotted lines and as previously explained. This additional drag quickly brakes the floating ring 100 and the spiral of tape 75.

The preferred embodiment of the invention has been illustrated and described, but changes and modifications can be made and some features can be used in different combinations without departing from the invention as defined in the claims.

What is claimed is:

1. A tape holder for a spiral reel of endless tape including in combination a drum having a cylindrical surface for contact with a tape, a tape storage section adjacent to the drum, supporting means for the spiral reel of tape in said storage section and including a rotatable flange in position to contact with the tape around the entire circumference of the spiral, a hub connected with the flange and extending axially into the space surrounded by the inner convolution of the spiral, the flange and hub being substantially coaxial with the drum and spaced from the drum by a distance somewhat greater than the width of the spiral of tape, said flange forming a wall of the storage section, a ring on the other side of the spiral from the flange and having a frusto-conical peripheral surface that contacts with said inner convolution, guide means located adjacent to the drum and in position to guide an approaching run of tape from a region adjacent to the drum to an off-set position from which the tape wraps as the outside convolution of the spiral in the storage section, other guide means located in position to guide a run of the tape moving from the inside convolution of the spiral outward and sideways away from the flange to the circumference of the drum on the side of the drum away from the approaching run of tape and around a substantial arc of the drum circumference in the same direction of rotation as the approaching run of tape.

2. The tape holder described in claim 1 characterized by a tensioning device about which the outgoing run of tape passes to apply some tension to said outgoing run of tape, and guide means in position to cause the tension of the tape to hold the tape against said arc of the drum.

3. The tape holder described in claim 1 characterized by tensioning means for pulling the outgoing run of tape, bearing means on which the drum and flange of the tape holder are rotatable and about which they are rotated by movement of the outgoing run of tape that is advanced by contact with said arc of the drum.

4. The tape holder described in claim 3 characterized by the tensioning means being a roller about which the tape reverses its direction of travel, an arm by which the roller is carried, and spring means that urge the arm to move in a direction to tension the run of the tape that passes to and from the roller.

5. A tape holder for an endless tape including in combination a drum having a cylindrical surface for contact with a tape, a tape storage section adjacent to the drum, supporting means for the tape in said storage section, and including a rotatable flange substantially coaxial with the drum and spaced from the drum by a distance somewhat greater than the width of face of the tape to be stored in a spiral between the drum and the flange, said flange forming a wall of the storage section and being located in position to contact with the edges of one side of the convolutions of the spiral of tape in the storage section, guide means located adjacent to the drum and in position to guide an approaching run of tape from a region adjacent to the drum to an off-set position from which the tape wraps as the outside convolution of the spiral in the storage section, other guide means located in position to guide a run of the tape moving from the inside convolution of the spiral outward and sideways away from the flange to the circumference of the drum on the side of the drum away from the approaching run of tape and around a substantial arc of the drum circumference in the same direction as the approaching run of tape, the tape holder having a tensioning device about which the outgoing run of tape passes to apply some tension to said outgoing run of tape, guide means in position to cause the tension of the tape to hold the tape against said arc of the drum, the tensioning means being in position for operating on the outgoing run of tape and including a roller about which the tape reverses its direction of travel, an arm on which the roller is carried, spring means that urge the arm to move in a direction to tension the runs of tape that pass to and from the roller, a pivot bearing axle for the arm coincident with the axis of the drum, the spring means including a spiral spring on said axle.

6. A tape holder for an endless tape including in combination a drum having a cylindrical surface for contact with a tape, a tape storage section adjacent to the drum, supporting means for the tape in said storage section and including a rotatable flange substantially coaxial with the drum and spaced from the drum by a distance somewhat greater than the width of face of the tape to be stored in a spiral between the drum and the flange, said flange forming a wall of the storage sections and being located in position to contact with the edges of one side of the convolutions of the spiral of tape in the storage section, guide means located adjacent to the drum and in position to giude an approaching run of tape from a region adjacent to the drum to an off-set position from which the tape wraps as the outside convolution of the spiral in the storage section, other guide means located in position to guide a run of the tape moving from the inside convolution of the spiral outward and sideways away from the flange to the circumference of the drum on the side of the drum away from the approaching run of tape and around a substantial arc of the drum circumference in the same direction as the approching run of tape, the supporting means also including a ring having a peripheral surface with which the inside convolution of the spiral of tape contacts, the ring being rotatable about an axis substantially coincident with the axis of rotation of the drum and flange but independently of the drum and flange.

7. The tape holder described in claim 6 characterized by the peripheral surface of the ring being frusto conical and the portion of the frusto conical surface with which the inside convolution of the spiral of tape contacts being of larger diameter than the circumference of the drum so that the ring is rotated at a slower speed than the drum by friction contact with the tape as the tape is pulled from the holder.

8. The tape holder described in claim 7 characterized by the drum and flange including hub portions and being connected together at their hub portions for rotation as a unit with each other, the flange having a frusto conical surface in substantial alignment with that of the ring and against which the inside convolution of the tape is pulled when subject to substantial tension in the pulling of the tape from the inside of the spiral of tape in said storage section.

9. The tape holder described in claim 6 characterized by an automatic brake for retarding rotation of the ring when it tends to coast at a speed faster than the speed of the drum and flange during deceleraton of the drum and flange.

10. A tape holder for a spiral coil of endless tape, said said holder including a space in which the spiral of tape is housed, and passages from which a portion of the endless tape passes to apparatus in which the tape is used and then back to the spiral coil of tape, a support on which the spiral coil of tape rests as the spiral coil of tape is rotated during movement of tape away from one side of the spiral coil and back to the other side of said spiral coil, a member mounted in another part of the holder for contact with the tape, said member being rotatable as tape is withdrawn and returned to said spiral coil, and an automatic brake including a rotary inertia element for stopping coasting of the spiral coil of tape when said member decelerates more rapidly than said inertia element, said automatic brake including a ring with which the inside convolution of the spiral coil of tape contacts and that rotates with the spiral coil of tape, and actuating means responsive to movement of the ring at a higher speed than said member.

11. The tape holder described in claim 10 characterized by a frame that holds said actuating means and that coasts when said member decelerates, and abutment surfaces on said support and with which the actuating means contact when the frame coasts faster than the speed of said member to operate the actuating means to apply the brake.

12. The tape holder described in claim 11 charcterized by the actuating means including balls, the frame being a ball carrier in which the balls are rotatable, and the abutment surfaces being inclined planes that the balls climb up on to produce an axial thrust to apply the brake.

13. The tape holder described in claim 12 characterized by a stationary surface adjacent to the ring, said ring having an annular area with which the balls contact when displaced axially, and the ring being sufficiently flexible to be distorted by the balls into contact with the stationary surface and thereby constituting a part of said brake.

References Cited by the Examiner

UNITED STATES PATENTS

| | | | |
|---|---|---|---|
| 1,505,389 | 8/1924 | Herm | 242—55.19 |
| 2,238,719 | 4/1941 | De Tartas | 242—55.19 X |
| 2,781,689 | 2/1957 | Heyer | 242—55.19 X |
| 2,918,536 | 12/1959 | Appert et al. | 242—55.19 X |
| 2,922,642 | 1/1960 | Cousino | 242—55.19 |
| 3,025,750 | 3/1962 | Polan et al. | 242—55.19 X |

OTHER REFERENCES

Honolka: Ger. App. 1,020,190, printed November 28, 1957 (KL42q–18).

MERVIN STEIN, *Primary Examiner.*

RUSSELL C. MADER, *Examiner.*

B. S. TAYLOR, *Assistant Examiner.*